Patented Nov. 23, 1926.

1,607,730

UNITED STATES PATENT OFFICE.

HOWARD WATERS DOUGHTY, OF AMHERST, MASSACHUSETTS, ASSIGNOR TO ALCHEMIC GOLD COMPANY, INC., OF NEW YORK, N. Y., A CORPORATION OF NEW YORK.

INK.

No Drawing.   Application filed January 18, 1924.  Serial No. 687,022.

This invention relates to inks and vehicles therefor, and particularly to metallic pigment inks adapted for use in stamping titles and decorative designs on book-bindings and for other purposes.

Heretofore I have described certain metallic pigment inks and vehicles therefor which are used in place of metallic leaf in making stamped impressions. The vehicles used in these inks have a resinous base which is dissolved in a relatively high boiling liquid. The inks are applied with a die heated to a temperature which is sufficiently high to ensure substantial drying of the ink during the impression interval by the vaporization of the solvent.

The object of the present invention is the provision of an ink having different characteristics but capable of application for the same purpose. An advantage of this ink is the avoidance, if desired, of the heated die although the die may be heated without injuring the impressions. Another advantage is the protective nature of the film formed when the vehicle dries on and about the pigment.

Other objects and advantages of the invention will be apparent as it is better understood by reference to the following specification in which the preferred embodiments of the invention are described.

I have found that rubber forms a suitable base for ink vehicles, particularly when combined with drying oils such as tung and linseed oil because the rubber furnishes the desired tackiness and the oil forms, on drying, a film or coating which protects the particles of metal in the pigment from corrosion.

Preferably a suitable thinner is also used. This should be a relatively high boiling solvent for rubber such as terpineol or turpentine. Solvents for rubber boiling between 200° and 300° C. are suitable. The use of such a thinner facilitates the solution of the rubber which is rather slowly soluble in the drying oils. The proportion of the thinner can be varied to give the ink any desired viscosity and to prevent "pulling" on the inking rollers of the press.

Any unvulcanized rubber can be used in preparing the vehicle but I prefer pure crepe rubber (latex coagulated with acetic acid). If a thinner is used the rubber is first dissolved therein and the drying oil is added. The solvent may be heated to expedite solution of the rubber but this is not essential. Care should be taken to avoid evaporating the solvent. Synthetic rubber or gutta percha can be substituted.

When an ink such as that described is applied with a heated die the volatile solvent evaporates during the impression interval and the drying oil is partly polymerized. Spontaneous oxidation of the vehicle occurs thereafter and a tough film coating forms on and about the pigment which is thus thoroughly protected from the action of the atmosphere. If a cold die is used the amount of volatile solvent should be reduced. Turpentine can be used in place of terpineol or other solvent and is desirable because it oxidizes when exposed to the atmosphere as do the drying oils.

The composition of the ink can be varied within wide limits by omitting some of the desirable ingredients or by substituting or combining those mentioned herein and their equivalents. Thus a satisfactory ink vehicle may consist of:

|   | Parts. |
|---|---|
| Tung or linseed oil | 50 |
| Turpentine | 47 |
| Pale crepe rubber | 3 | and tung and linseed oils may be mixed in all proportions to form the drying oil constituent of the vehicle. Terpineol or other solvents for rubber having a boiling point approximately within the range of 200° to 300° C. can be substituted for turpentine or one or more of these solvents can be substituted for a portion of the turpentine. A characteristic vehicle thus prepared consists of:

|   | Parts. |
|---|---|
| Tung oil | 50 |
| Turpentine | 27 |
| Terpineol | 20 |
| Pale crepe rubber | 3 |

Any of the vehicles prepared as described can be combined with a metallic or other pigment by incorporating the desired proportion of the latter therewith. Approximately two parts of bronze powder to one part of the vehicle by weight usually affords a suitable ink. The bronze may be the commercial article consisting of a powdered alloy of copper or other metal. It is thoroughly incorporated with the vehicle and the ink is ready for use. The ingredients of the vehicle are neutral and consequently the ink may be permitted to stand after mixing without danger of tarnishing the pigment.

The ink and vehicle as described are comparatively inexpensive and provide an enduring impression which, if skillfully made, closely resemble leaf stamping. It is less expensive than leaf work because of the elimination of several operations which are necessary in applying leaf. The application of the ink is extremely simple as it is used exactly as ordinary printer's ink is applied with the exception that the die is generally heated by means of an electric resistance element. The ink is applied to the die by means of inking rollers which pass alternately over the die and over an ink table or fountain. The ink, when properly prepared, will flow smoothly through the rollers and will not dry thereon to any appreciable extent or become gummy.

Various changes can be made in the composition as described without departing from the invention or sacrificing any of the advantages thereof.

I claim:—

1. In an ink, a vehicle comprising rubber dissolved and combined with a drying oil and a rubber solvent having a boiling point approximately between 200° and 300° C.

2. In an ink, a vehicle comprising rubber dissolved and combined with a drying oil, turpentine and a rubber solvent having a boiling point approximately between 200° and 300° C.

3. In an ink, a vehicle comprising rubber dissolved and combined with a drying oil, turpentine and terpineol.

4. In an ink, a vehicle comprising rubber dissolved and combined with tung oil and a rubber solvent having a boiling point approximately between 200° and 300° C.

5. In an ink, a vehicle comprising rubber dissolved and combined with tung oil, turpentine and a rubber solvent having a boiling point approximately between 200° and 300° C.

6. In an ink, a vehicle comprising rubber dissolved and combined with tung oil, turpentine and terpineol.

In testimony whereof I affix my signature.

HOWARD WATERS DOUGHTY.